United States Patent [19]
Magee

[11] 3,871,079

[45] Mar. 18, 1975

[54] CUTTING GUIDE AND BOARD ASSEMBLY

[76] Inventor: Robert L. Magee, 401 W. Lake Rd., Hammondsport, N.Y. 14840

[22] Filed: Aug. 13, 1973

[21] Appl. No.: 387,659

[52] U.S. Cl. ................................................. 30/294
[51] Int. Cl. ........................ B26b 29/00, B26d 7/02
[58] Field of Search...................... 30/286, 289, 294

[56] References Cited
UNITED STATES PATENTS

| | | | |
|---|---|---|---|
| 197,901 | 12/1877 | Sargent | 30/294 |
| 764,848 | 7/1904 | Howard | 30/294 |
| 1,732,564 | 10/1929 | Mayer | 30/294 |
| 2,013,893 | 9/1935 | Matthews | 30/294 |
| 3,394,457 | 7/1968 | Holder | 30/294 |
| 3,543,627 | 12/1970 | Hearns | 30/294 |

FOREIGN PATENTS OR APPLICATIONS

| | | | |
|---|---|---|---|
| 18,560 | 7/1882 | Germany | 30/289 |

Primary Examiner—Al Lawrence Smith
Assistant Examiner—J. T. Zatarga
Attorney, Agent, or Firm—Mason, Mason & Albright

[57] ABSTRACT

A cutting guide and board assembly preferably includes a rectangular board with side plates fastened along each shorter side and an elongated flexible guide element extending over the board's upper surface parallel to the longer sides of the board. The guide element is positioned about centrally of the board and each of its ends are fastened to a side plate so that the guide element bridges the plates leaving a space between the upper surface of the board and the bottom of the element. The upper board surface has two grooves, one beveled at about 45 degrees and the other with straight sides extending normal to the board. The guide element has a vertical surface and an angled edge along its opposite longitudinal sides in alignment with the straight and beveled grooves respectively so that a mat can be held down and cut using the guide element to correctly position a knife blade.

7 Claims, 2 Drawing Figures

PATENTED MAR 18 1975   3,871,079

CUTTING GUIDE AND BOARD ASSEMBLY

SUMMARY OF THE INVENTION

The present invention is a measuring and cutting aid device designed particularly to cut mats used in framing pictures. Currently such cutting devices are generally heavy, complicated and expensive having parts and moving elements subject to wear and malfunction. The cutting guide and board assembly of the instant invention has essentially no moving elements which are subject to wear and all parts are fixed in place. Further, the assembly can be used by a left or right handed operator for measuring, marking, squaring and cutting sheet material. Still further, the subject assembly is inexpensive, portable and easy to use. Also, the device may, if desired, be utilized as a guide for cutting glass.

DESCRIPTION OF THE PREFERRED EMBODIMENT

Figure 1:
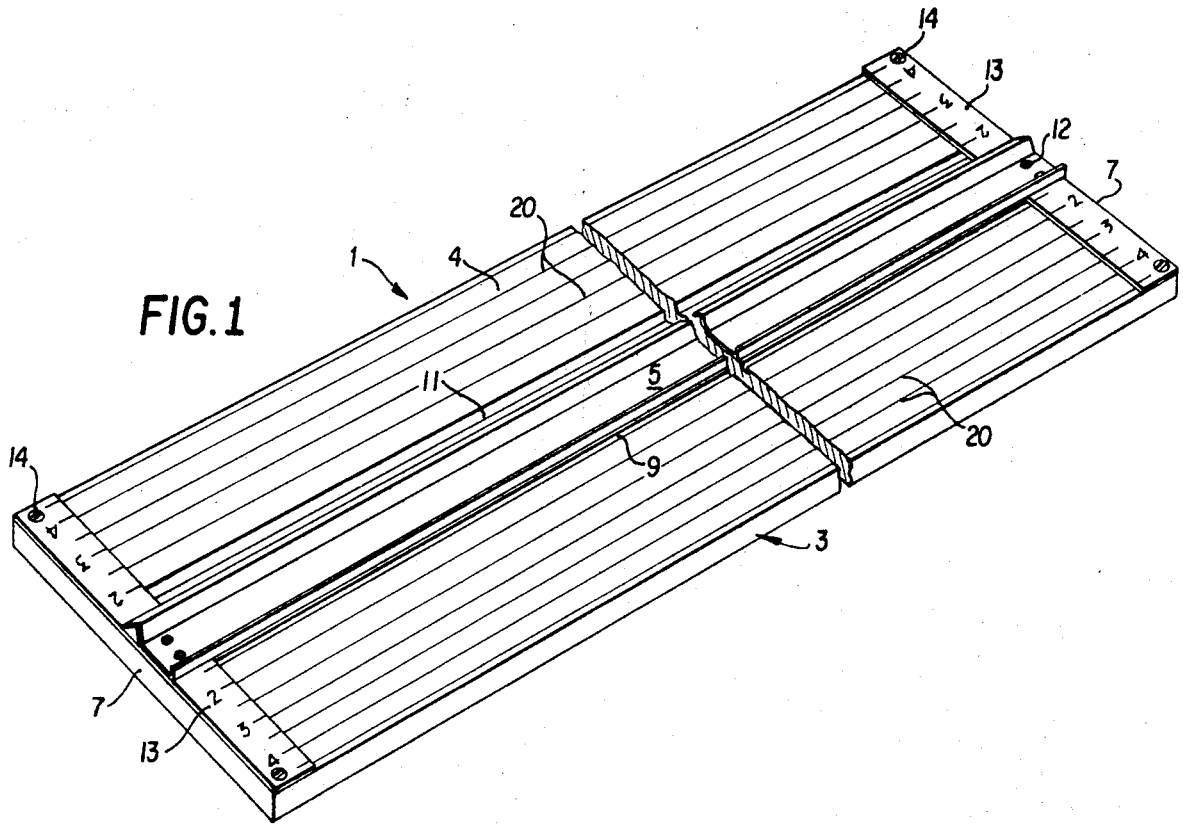
FIG. 1 is a perspective view of the cutting guide and board assembly.
Figure 2:
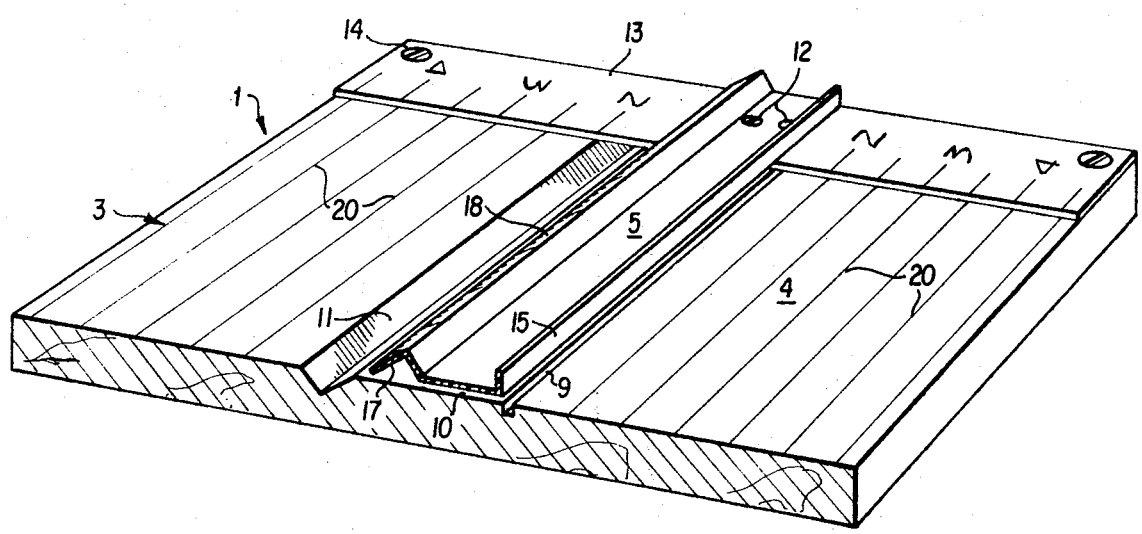
FIG. 2 is a further perspective view, showing in section the assembly of FIG. 1.

In the drawings, the cutting guide board assembly 1 is shown comprised of a board 3, of wood or plastic which is preferably rectangular in configuration as shown in the drawings. A straight guide element, such as a bar 5, preferably of flexible material (spring steel or plastic), is secured to each of the shorter sides 7 of board 3 to bridge the upper surface 4 of board 3.

Board 3 has a vertical groove 9 and a beveled groove 11 which extend parallel to one another and are spaced apart in alignment with the longitudinal sides of bar 5. The bar 5 is secured by bolts 12, or other suitable securing means such as screws or rivets, to a plastic or steel tape 13 fastened along each shorter side 7. The tapes 13 are preferably in the form of flat plates with measuring indicia thereon and are secured by bolts 14, or other suitable securing means, to board 3. Tapes 13 have straight edges so that the inner edges afford squaring means for abutting edges of the mat (or glass) material being cut or worked. Bar 5 is raised above board 3 to leave a space 10 between surface 4 and the bottom of bar 5. Depressing the bar 5, by manual pressure for instance, causes bar 5 to bear against the underlying material sufficiently to hold it in place during working. Alternatively, the material may be wedged or otherwise fixed in desired working position.

Bar 5 is preferably an angle bar with an upright straight vertical surface 15 along one elongated edge and is normally affixed to board 3 so that surface 15 is held in alignment with the inner side of vertical groove 9. The opposite longitudinal edge 17 of bar 5 is beveled, preferably at about 45° relative to surface 4 and is in alignment with the inner side of beveled groove 11. Edge 17 is in the form of an upwardly extending, angular projection with an outer angled guide surface 18 having measuring indicia thereon.

Guide bar 5 is preferably mounted approximately centrally of board 3 and upper surface 4 has aligned stripes 20 arranged at spaced intervals parallel to bar 5. In order to accommodate mats for framing, say 40 inches long, board 3 is conveniently about 43 inches long and 8 inches wide. Bar 5 is of equal length and about 1 to 2 inches wide.

In the use of the guide and board assembly, one determines over-all size of the mat to be cut. The over-all horizontal dimension of the mat equals the width of both side mat margins plus horizontal mat window dimension. The over-all vertical dimension equals the width of the top mat margin plus the vertical mat window dimension plus the width of the bottom mat margin. One begins by sliding the mat board under guide bar 5 and the mat board is abutted against either tape 13. Using the guide scale, one then measures and marks with pencil or other indicia the over-all horizontal or vertical mat dimension. Then the mat board is turned 90° and the measure-marking procedure is repeated for the second over-all mat dimension.

Next, the mat board is again abutted against either tape 13 and the penciled measure marks on the mat are aligned with the unbeveled edge of the cutting guide blade. Making certain that the mat being cut is square with both plate 13 and guide bar 5 one also uses lines 20 on the board 3. Then the cutting guide bar 5 is pressed down on the mat board with one hand. With the other hand, one cut or several light cuts with a sharp utility knife or other suitable cutting device are made using surface 15 for the outer portion of the mat and edge 17 for the perimeter of the window as a guide. Then the mat board is turned 90° and the procedure is repeated for the second cut, and so on.

Having thus described my invention, which I claim as new and desire to secure by Letters Patent of the United States is:

1. A cutting guide and board assembly comprising a grooved board and a straight guide element, said element being secured to opposite sides of said board and extending across the upper surface of smae, said board having a vertical groove and a beveled groove in the upper surface of said board, said grooves extending parallel to one another in spaced apart relationship, said guide element being an elongated angled flexible bar of single-piece construction having a beveled edge and a straight edge on the opposite longitudinal sides of said bar and in registered alignment with said beveled groove and said vertical groove respectively, said straight edge being an upwardly bent portion having an upright vertical surface that extends normal to the upper surface of said board, said beveled edge including an angular projection that comprises an upwardly bent angled portion followed by a downwardly bent angled portion that extends upwardly with respect to said board, said downwardly bent angled portion providing an angled side that affords a guide for a cutting member, squaring means at each of said opposite sides of the board and said guide bar being secured to the opposite, sides to bridge said upper surface leaving a space between said surface and the bottom of said bar, whereby sheet and board material can be inserted in said space below said bar and manually cut using said grooves and the edges of said longitudinal sides as cooperating guides.

2. The assembly of claim 1, wherein said beveled edge and said beveled groove have aligned sides that are angled about 45° with respect to said upper surface of the board.

3. The assembly of claim 1, wherein said beveled edge and said vertical surface each have measuring indicia.

4. The assembly of claim 1, wherein the upper surface of said board has aligned stripes that are spaced apart from one another, said stripes being parallel to said grooves to afford scales across the entire upper surface of said board.

5. The assembly of claim 1, wherein said board is rectangular when viewed in plan, the shorter sides of said board having scaled squaring means extending adjacent the peripheries of said sides, the ends of said guide bar being secured to said squaring means.

6. The assembly of claim 5, wherein said squaring means includes a flat plate member with measuring indicia that extends along the edges of each said shorter side to afford an abutting surface for the material being worked.

7. The assembly of claim 6, wherein said guide bar is flexible whereby the material being worked is held by said bar when the latter is depressed.

* * * * *